United States Patent [19]

Abe et al.

[11] 4,429,986
[45] Feb. 7, 1984

[54] CONTROL METHOD OF ELECTROPHOTOGRAPHIC COPYING MACHINE

[75] Inventors: Shunichi Abe; Mitsuo Akiyama, both of Hachioji, Japan

[73] Assignee: Konishiroku Photo Industry Co., Ltd., Tokyo, Japan

[21] Appl. No.: 290,394

[22] Filed: Aug. 5, 1981

[30] Foreign Application Priority Data

Aug. 20, 1980 [JP] Japan ............................ 55-113481

[51] Int. Cl.$^3$ .......................................... G03G 15/28
[52] U.S. Cl. .................................... 355/8; 355/14 R
[58] Field of Search .............. 355/3 R, 8, 14 R, 77, 355/133

[56] References Cited

U.S. PATENT DOCUMENTS 3,990,792 11/1976 Kono et al. ............................ 355/8
4,159,173 6/1979 Kasuga ................................. 355/8

Primary Examiner—Fred L. Braun
Attorney, Agent, or Firm—Jordan B. Bierman; Linda Bierman; C. Cornell Remsen, Jr.

[57] ABSTRACT

In an electrophotographic copying machine of the type using a slit exposure optical system with reciprocating carriages, movement of these carriages at the time a transfer medium is being processed in the usual fixing device often causes a jittering of the apparatus which adversely affects the quality of the image being fixed. The method according to the present invention avoids this problem by assuring that there is no movement, particularly no return movement of the carriages from the time the transfer medium enters the fixing device until it is discharged therefrom.

3 Claims, 3 Drawing Figures

CONTROL METHOD OF ELECTROPHOTOGRAPHIC COPYING MACHINE

BACKGROUND OF THE INVENTION

1. Field of the Invention

The present invention relates to the electrophotographic copying machine having an operational mode such that a toner image formed on a charge retaining member is to be transferred onto a transfer paper, and particularly to the control of a moving member by which the optical exposure scanning of an original is performed.

2. Description of the Prior Art

As is known, in an electrophotographic copying machine, a series of the following processes are performed; an optical exposure scanning of an original is performed by the movement of a document glass plate or an optical system for exposure to light, (hereinafter collectively referred to as a moving member); an electrostatic latent image is formed on a charge retaining member such as a photosensitive drum; then a toner image developed on the charge retaining member is transferred onto a transfer paper.

Meanwhile, in the abovementioned image transfer process, the following processes are performed: a transfer paper is conveyed toward a fixing means by a paper conveyance means on the one hand; and at the ame time a toner image is transferred onto another portion of said transfer paper which is facing opposite to a charge retaining member on the other hand, therefore, the transfer paper is in an extremely unstable state, and if any shock is given to the machine frame or to the transfer paper, the charge retaining member and the transfer paper being transfer processed are caused to deviate from the correlatively proper positions thereof, that is, the so-called "jittering" is caused. In a phenomena of this kind, both the charge retaining member and the image transferred portion of the transfer paper are heavily shocked by the coincidence of the time when the front end of a transfer paper collides with the guide plate of a fixing means or a fixing roller, at the time when the return movement of a moving member having a large inertia is commenced, and thus the image quality especially in the said image transferred portion is lowered seriously.

So far, to overcome the said shortcoming, the distance of reciprocation of the moving member has been specifically determined and the length of a paper conveyance means has been fixed so that the aforesaid times dot not coincide with each other. However, with the countermeasures of this sort, it is impossible to change the strokes of a moving member according to copy sizes, and an idling time has to be provided, and the time required for a continuous copying becomes longer when a small sized original is applied, or when a variable magnification is required for copying.

SUMMARY OF THE INVENTION

Accordingly, an object of the invention is to provide a control method for an electrophotographic copying machine, wherein the so-called "jittering" phenomenon cannot occur, the strokes of the moving member are freely variable to answer the copying purposes.

To summarize the present invention which is to accomplish the said object, a control method for an electrophotographic copying machine is proposed, which comprises forming a latent image on surface of a charge retaining member by movement of a moving member, such as a document glass plate or an optical system for exposure to light, developing said latent image by developing means for forming a toner image, transferring said toner image to a transfer paper, fixing said toner image on said transfer paper by a fixing means, establishing a time zone to prohibit moving said moving for a specific period time just before the front end of said transfer paper reaches said fixing means, and then commencing to move said moving member outside said time zone.

DETAILED DESCRIPTION OF THE PREFERRED EMBODIMENTS

Figure 1:
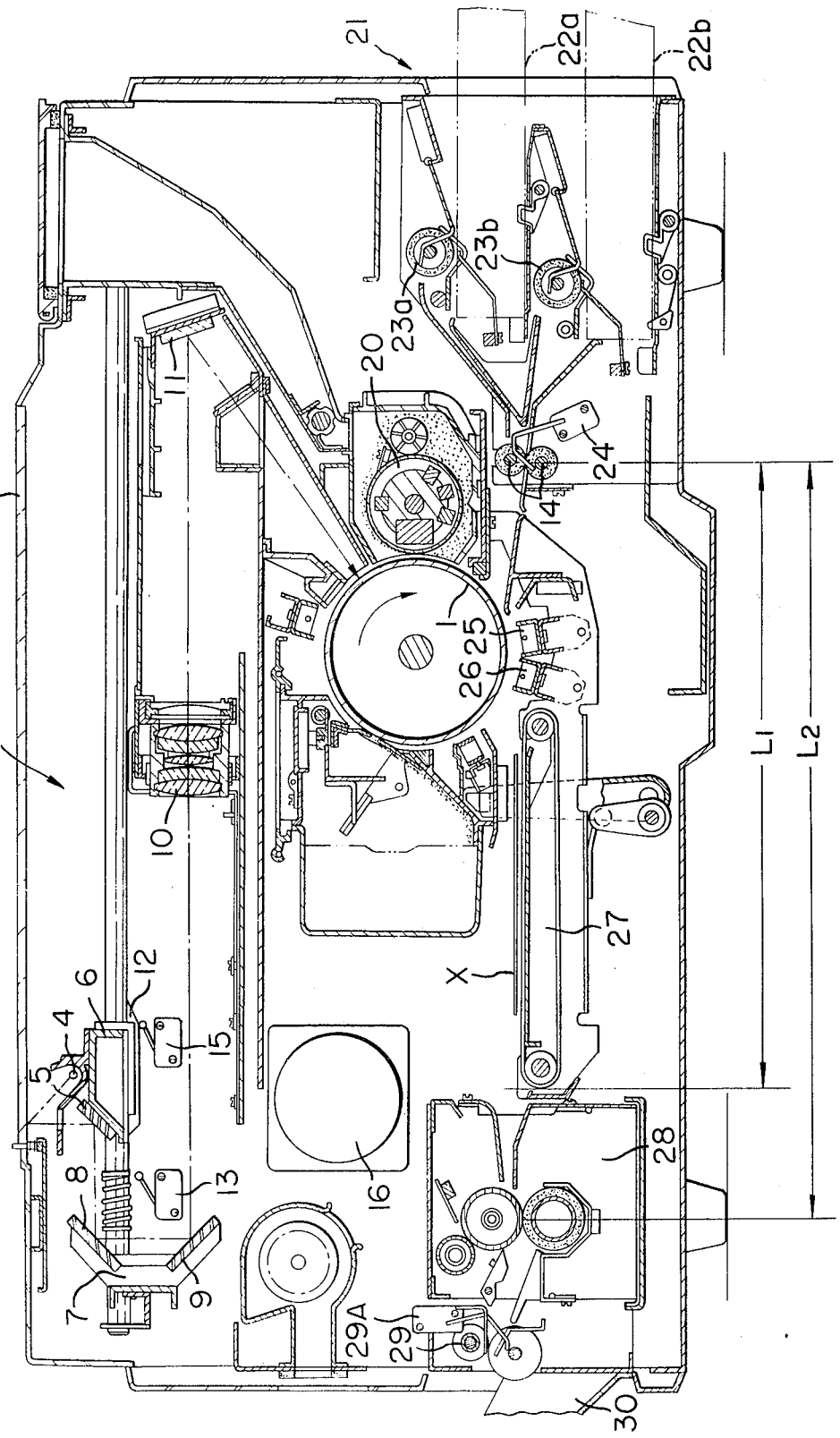
FIG. 1 is a partially diagrammatic cross-sectional view of the inside structure of an electrophotographic copying machine according to the present invention.
Figure 2:
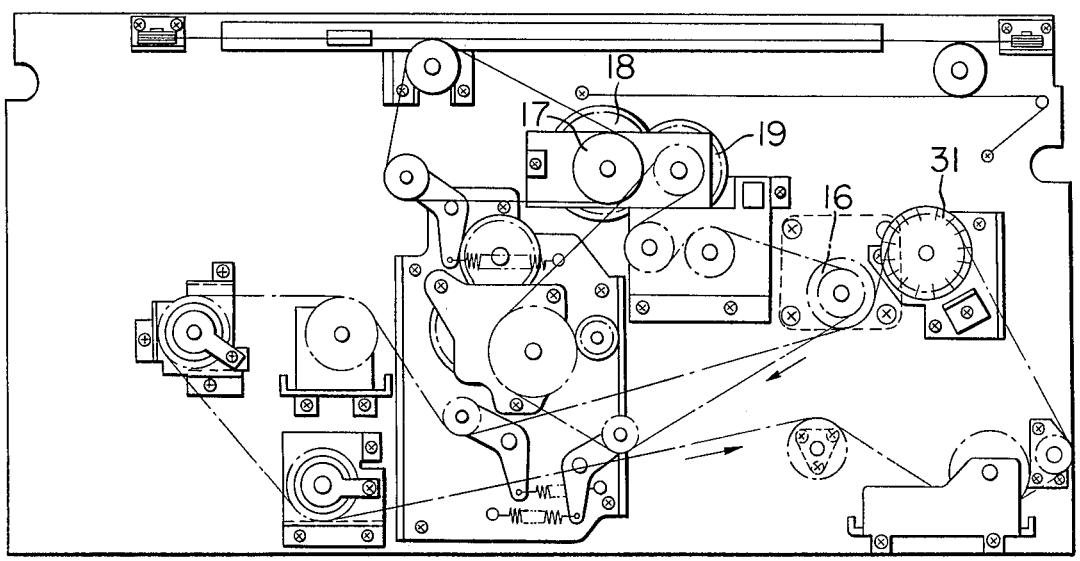
FIG. 2 is a side view of the drive section of the said copying machine.

Now, the details of the invention are explained, referring to the example thereof shown in the drawings attached hereto:

FIG. 1 shows the structure of an electrophotographic copying machine provided with the present invention, wherein there is positioned above the upper portion of photosensitive drum 1, which is driven to rotate in the direction of the arrow, an optical system for slit-exposure 3 which optically scans an original placed on document glass plate 2. Said optical system for slit-exposure is equipped with a primary movable carriage 6 carrying a projection lamp 4 and a primary mirror 5, in which the reflected light from primary mirror 5 is reflected again from a secondary mirror 8 and a tertiary mirror 9 mounted on a secondary movable carriage 7 which is synchronously moved with the movement of the primary movable carriage 6 at one half the speed thereof, and then induced into lens 10. Said lens 10 focuses an original image on the surface of photosensitive drum 1 through a fourth mirror 11. The aforesaid optical system for slit-exposure 3 is equipped with an initial position detector 13 actuated by cam 12 of primary movable carriage 6, and also a paper feeding start detector 15 by which the rotation of paper feeding rollers 14 to be mentioned later is controlled. Also, as shown in FIG. 2, movable carriages, 6 and 7 are reciprocated by drive drum 17 driven by drive motor 16 which also drives photosensitive drum 1, and the direction of rotations of said drive drum 17 is selected by forward clutch 18 and returning clutch 19, both of which are mounted between drive drum 17 and drive motor 16.

An electrostatic latent image on the surface of photosensitive drum 1 is developed with toners while said latent image is passing through developing means 20, and is then transferred onto transfer paper X which was fed by paper feeding means 21. The paper feeding means 21 has paper feeding rollers, 23a and 23b, which feed transfer paper X one after another from paper cassettes, 22a and 22b, and the transfer paper X fed by said paper feeding rollers, 23a and 23b, is received by paper registration rollers 14, and then fed thereby to photosensitive drum 1. Immediately in front of said paper registration rollers 14, temporary stoppage detector 24 is provided for detecting the front and rear ends of image transfer paper X.

Image transfer electrode 25 and separation electrode 26 are providd beneath the said photosensitive drum 1, a toner image on transfer paper X is conveyed to fixing means 28 by paper conveyance means 27 and then ejected onto copy ejecting tray 30 by the operation of copy ejecting rollers 29. In this case, the return movement of optical system for slit-exposure 3 is prohibited for the period from the time immediately before the front end of a transfer paper X reaches fixing means 28 until the time when said transfer paper X is entirely taken into said fixing means 28, however, the time zone prohibiting from said returning movement will be apparent from a reading of the description hereinafter.

Figure 3:
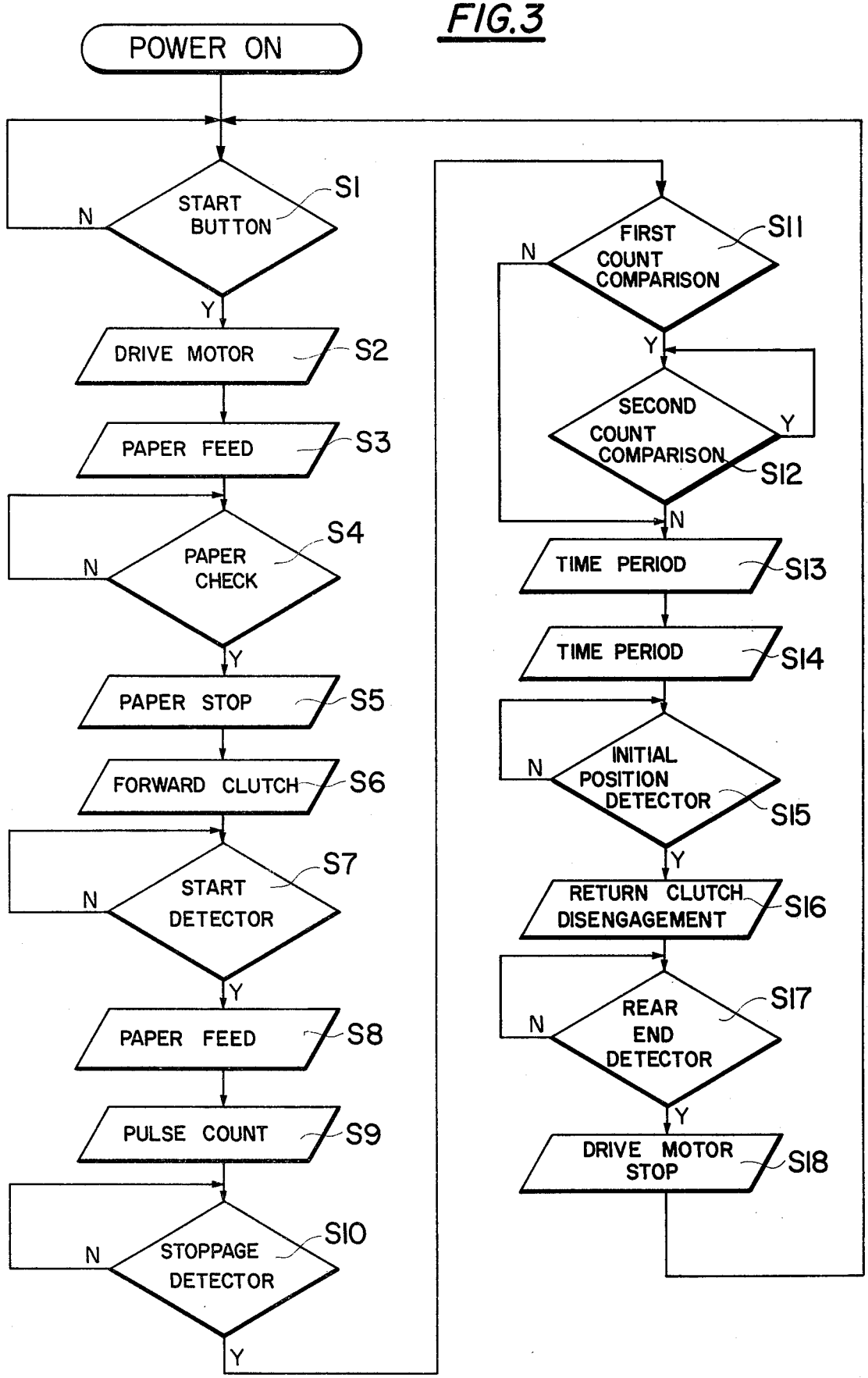
FIG. 3 is a control flow sheet of the said copying machine.

FIG. 3 shows the control flow applicable to the case wherein the drive control of an electrophotographic copying machine is performed by a microcomputer. Besides, in the case in which said drive control is performed by a hardware system without using any microcomputer, it is apparent that a control circuit equivalent to said control flow can be substituted therefor.

In FIG. 3, firstly, a judgement is made on wheter or not a copy start button was pushed (Step S1); when the button has been pushed, photosensitive drum 1 begins rotate by starting drive motor 16 (Step S2); paper feeding rollers 23a or 23b are rotated (Step S3). Thereafter, a check is made on whether the front end of a transfer paper X is detected by temporary stoppage detector 24 (Step S4); if detected movement of the transfer paper is stopped by stopping paper feeding roller 23a or 23b (Step S5); the starting of optical system for slit-exposure 3 is commenced by engaging forward clutch 18 (Step S6). A determination is made on whether paper feeding start detector 15 is activated by the commencement of the rotation of optical system for slit-exposure 3 (Step S7); if the result is positive, paper registration roller 14 commences to rotate and then transfer paper X is fed toward photosensitive drum 1 (Step S8); at the same time, a counter built in a microcomputer (not shown) is cleared and then starts to count the number of input pulses applied from slit disc 31 which synchronizes with the angle of rotation of photosensitive drum 1 (Step S9).

Next, a determination is made on whether the rear end of a transfer paper X is detected by temporary stoppage detector 24 (Step S10); when detected, the determination is made on whether the value as computed by the aforesaid counter is larger than the primary set value N1 (Step S11). The primary set value N1 corresponds to the time period from when the front end of transfer paper X moves to the front of fixing means 28 from paper registration roller 14, in other words, the distance L1 from paper registration roller 14 to the point in immediate front of fixing means 28 (refer to FIG. 1). When the value as computed by the counter is larger than the primary set value N1, the judgement is then made on whether the value of the said counter is larger than a secondary set value N2 which is larger than the primary set value N1 (Step S12); the disengagement of going clutch 18 and engagement of returning clutch 19 are prohibited until the value of the said counter becomes larger than the secondary set value N2. The secondary set value N2 described herein corresponds to the period during which the front end of transfer paper X reaches fixing means 28 from paper registration roller 14, in other words, the distance L2 from paper registration roller 14 to the center of fixing means 28 refer to FIG. 1. Further, in Step S10, when the value of the counter is smaller than primary set value N1; forward clutch 18 is immediately disengaged and at the same time returning clutch 19 is engaged.

Thus, a time period for prohibiting the return movement of optical system of slit-exposure 3 is established, in Steps S13 and S14, forward clutch 18 is disengaged and at the same time returning clutch 19 is engaged outside the time period for prohibiting from returning the movement thereof, the returning movement of optical system for slit-exposure 3 is started, and when the primary movable carriage 6 of optical system for slit-exposure 3 is returned to the initial position, said initial position thereof is detected by initial position detector 13 (Step S15); and returning clutch 19 is then disengaged (Step S16). Thereafter, the rear end of transfer paper X is detected by paper ejecting detector 29A equipped with paper ejecting rollers 29 (Step S17), and at that time, drive motor 16 is stopped.

In the above described example, an embodiment is described in which the time period for prohibiting undesired movement is provided by a counter built into a microcomputer; in the present invention, it is also possible to provide a time period for prohibiting undesired movement by means of a timer activated upon commencement of paper feeding.

Consequently, according to the present invention, not only the so-called jittering caused on a transferred image can be avoided, but also a moving member can immediately be returned if said returning movement is made outside the time period for prohibiting such movement, and therefore, the time required can be shortened for a continuous copying while a small sized original is applied to or when a variable magnification is required for copying.

What is claimed is:

1. In a method of electrophotographic copying utilizing a slit exposure optical system of the type equipped with a reciprocating primary movable carriage and a reciprocating secondary movable carriage having a speed of one half the primary movable carriage for scanning an original and directing the scanned image onto a photosensitive drum, means developing the image formed on said drum, and means moving a transfer medium from a position at one side of the drum, beneath said drum to transfer the image from the drum onto the transfer medium, and thence into a device where the transferred image is fixed upon the transfer medium, the improvement comprising prohibiting return movement of the reciprocating carriages from the time the leading edge of the transfer medium is at a position immediately in front of the fixing device, until it is fully discharged therefrom.

2. In a method of electrophotographic copying utilizing a slit exposure optical system of the type equipped with a reciprocating primary movable carriage and a reciprocating secondary movable carriage having a speed of one half the primary movable carriage for scanning an original and directing the scanned image onto a photosensitive drum, means developing the image formed on said drum, and means moving a transfer medium from a position at one side of the drum, beneath said drum to transfer the image from the drum onto the transfer medium, and thence into a device where the transferred image is fixed upon the transfer medium, the improvement comprising the steps of measuring the time period covering the movement of the trailing edge of the transfer medium from said position at one side of the drum until the forward edge of said transfer medium reaches a position immediately before said fixing device, measuring the time period covering the movement of the trailing edge of the transfer medium from said position at one side of the drum until the forward edge of said transfer medium reaches a position within said fixing device, determining the time periods of the forward and reverse movements of said carriages, and prohibiting reverse movement of said carriages for the period of time the leading edge of said transfer medium is at a position immediately before the fixing device until the trailing edge of said transfer medium has passed through said fixing device.

3. A control method for electrophotographic copying apparatus of the type having a slit exposure optical system equipped with reciprocating primary and secondary carriages of which the secondary carriage moves at half the speed of the primary carriage, forward and reverse clutches controlling said reciprocal movement and means directing the scanned image onto a photosensitive drum, a prime mover driving the carriages of the optical systm and the photosensitive drum, means developing the image formed on the drum, and means including paper feed rollers and paper registration rollers for moving a transfer medium along a path from a position at one side of the drum, beneath the drum to transfer the image from the drum to the transfer medium, and thence into a device where the image is fixed upon the transfer medium, in combination with a copy start button initiating action of said prime mover, comprising the steps of actuating said copy start button to rotate said drive motor, said drum, and said paper feed and registration rollers to initiate movement of said transfer medium along said path up to said paper registration rollers, detecting the front edge of said transfer medium and stopping said paper feed rollers to halt movement of said transfer medium, starting movement of said optical system by engagement of said forward clutch, activating said registration rollers to move said transfer medium along the path to the photosensitive drum, correlating the rotation of the drum with a first time of movement of the rear end of the transfer medium from the registration rollers until the front end of the transfer medium reaches a point immediately in front of the fixing device, correlating the rotation of the drum with a second time of movement of the rear end of the transfer medium from the registration rollers until the front end of the transfer medium reaches a point within the fixing device, maintaining normal engagement of the clutches until the second time of movement is greater than the first, then disengaging said clutches until the front end of said transfer medium is entirely within said fixing device, engaging said reverse clutch until the optical system has returned to its initial position, passing said transfer medium through paper ejecting rollers from said fixing device, and stopping said drive motor when the rear end of said transfer medium passes by said ejecting rollers.

* * * * *